United States Patent [19]
Fock et al.

[15] 3,689,592
[45] Sept. 5, 1972

[54] HEAT-HARDENABLE, FOIL CONTAINING POLYMERIZATE WITH PENDENT GLYCIDYL GROUPS

[72] Inventors: Jurgen Fock, Essen-Bredeney; Ulrich Holtschmidt, Essen, both of Germany

[73] Assignee: Th. Goldschmidt A.-G., Essen, Germany

[22] Filed: Nov. 23, 1970

[21] Appl. No.: 92,217

[30] Foreign Application Priority Data

Dec. 8, 1969    Germany...P 19 61 452.9

[52] U.S. Cl. ..........260/836, 260/29.6 WB, 260/898, 260/901
[51] Int. Cl. .............................................C08g 45/04
[58] Field of Search........................................260/836

[56] References Cited

UNITED STATES PATENTS

| | | | |
|---|---|---|---|
| 2,849,418 | 8/1958 | Fang | 260/836 |
| 3,580,972 | 5/1971 | Isaksen | 260/836 |
| 3,505,128 | 4/1970 | Fujii | 148/6.2 |

FOREIGN PATENTS OR APPLICATIONS

| | | | |
|---|---|---|---|
| 4,514,673 | 5/1970 | Japan | 260/836 |
| 1,106,083 | 3/1968 | Great Britain | 260/836 |

OTHER PUBLICATIONS

Polymer Science and Technology, Post P, Vol. 7, Abstract 6853 Nov. 30, 1970

*Primary Examiner*—Paul Lieberman
*Attorney*—James E. Bryan

[57] ABSTRACT

This invention relates to a heat-hardenable foil and process for the preparation thereof, the foil comprising a mixture of copolymerizates (A) and (B) in a weight ratio of 1:20 to 1:3, A. being an elastomeric copolymerizate obtained by polymerization of
  a. 70 to 99 per cent by weight of an acrylic acid alkyl ester, whose alkyl residue has one to eight carbon atoms, and
  b. 1 to 30 per cent by weight of a compound selected from the group consisting of an unsaturated monocarboxylic acid or an anhydride of an unsaturated dicarboxylic acid, and
B. being a hard-brittle copolymerizate obtained by polymerization of
  a 60 to 70 per cent by weight of a compound selected from the group consisting of styrene or a methacrylic acid alkyl ester whose alkyl residue has one to four carbon atoms,
  b 1 to 20 per cent by weight of a glycidyl ester of acrylic or methacrylic acid, and
  c. 1 to 20 per cent by weight of a compound selected from the group consisting of an unsaturated monocarboxylic acid or an unsaturated dicarboxylic acid.

11 Claims, No Drawings

HEAT-HARDENABLE, FOIL CONTAINING POLYMERIZATE WITH PENDENT GLYCIDYL GROUPS

This invention relates to a heat-hardenable, carrier-free foil and process for the preparation thereof.

More particularly, it relates to a heat-hardenable foil consisting of a polymerizate mixture which, when pressed upon the surfaces of materials, especially sheets of wood material, with pressure and heat, will form, while hardening, impact-resistant, weather-resistant surface layers.

It is known to coat and improve the surfaces particularly of sheets of wood materials, such as chip plates, by pressing thereupon heat-hardenable products at elevated temperatures. Used therefor are generally synthetic resins which harden due to a condensation reaction. Such synthetic resins are, for example, preliminary condensates of phenol-formaldehyde or urea-formaldehyde or melamine-formaldehyde resins. These resins cannot, however, be processed to self-supporting elastic foils so that solutions of these resins must be applied to carrier webs, particularly webs of paper. After drying to a specific humidity content, the resin-coated carrier webs may be employed for the surface improvement of materials.

It also has been already proposed that carrier webs be impregnated and coated with resins that harden by polymerization. Examples of such resins are the diallyl phthalate prepolymers. The manufacture of these prepolymers and the impregnation of the carrier webs therewith involves, however, considerable difficulties. A further disadvantage is that a radical hardening catalyst which limits the storage life of the products from this process must be added to the resins. Moreover, the resins have the tendency to adhere to the sheet metal of the mold while being extruded.

It is also known, for example from U. S. Pat. No. 2,604,463, to manufacture thermoplastic copolymerizates with reactive groups. Such reactive groups are the epoxy group and the carboxyl group. These groups react at elevated temperatures with a cross-linking of the copolymerizate, which is thereby converted into an insoluble and infusible state. The hardened products are, however, brittle, difficult to handle and unsatisfactory in their mechanical properties.

For the purpose of reducing the brittleness of thermoplastic polymerizates it already has been proposed that natural or synthetic rubber be added thereto. Thus obtained, according to Belgian Pat. Nos. 552,579and 558,041, by a grafting polymerization of butadienestyrene mixed polymerizates, are impact-resistant injection-molded masses. According to German Pat. No. 1,076,377, thermoplastic impact-resistant molds are made by polymerization of methyl-methacrylate in the presence of a mixed polymerizate of butadiene and methyl-methacrylate.

It is further known from Belgian Pat. No. 564,366, to improve the internal viscosity of such thermoplastic molded masses by introducing acrylonitrile therein. The impact resistance also may be improved by virtue of the fact that the elastomeric component is cross-linked to a small extent. This may be achieved, for example, by the addition to the monomer mixture of divinyl benzene or of other compounds adapted to be bifunctionally added.

The copolymerizates of the prior art remain, however, thermoplastic. They also have the disadvantage that their stability to aging and particularly to weathering is unsatisfactory because of the olefinic character of the elastomeric components based on dienes. The good impact resistance is lost after a relatively short time due to the influence of air, light and heat.

In addition thereto, hardenable thermoplastic polymerizates are known for use in surface coating, and employed in the manufacture thereof are, among others, also monomers which result actually in elastomeric polymerizates. A specific two-stage manufacturing process has been described in U. S. Pat. No. 3,297,621. Produced thereby, however, are products which harden already at room temperature and are, thus, not adapted to be stored and, furthermore, cannot be processed to hard foils.

The present invention provides heat-hardenable, carrier-free polymerizate foils which, in the hardened condition thereof, display, in addition to the known good chemical and mechanical properties, particularly also the property of impact resistance.

All of the required properties are surprisingly present in the heat-hardenable, carrier-free foil of the present invention which comprises A. an elastomeric copolymerizate obtained by polymerization of
 a. 70 to 99 per cent by weight of an acrylic acid alkyl ester whose alkyl residue has one to eight atoms,
 b. 1 to 30 per cent by weight of an unsaturated monocarboxylic acid or an anhydride of an unsaturated dicarboxylic acid,
 if desired
 c. 0 to 20 per cent by weight of a vinyl monomer, particularly styrene, acrylonitrile, or methylmethacrylate, resulting during homopolymerization in a hard-brittle polymerizate,
 d. 0 to 2 per cent by weight of a cross-linking monomer with at least two reactive, non-conjugated double bonds in the molecule, and
B. a hard-brittle copolymerizate obtained by polymerization of
 a. 60 to 70 per cent by weight of styrene or of a methacrylic acid alkyl ester whose alkyl residue has one to four carbon atoms,
 b. 1 to 20 per cent by weight of a glycidyl ester of acrylic or methacrylic acid,
 c. 1 to 20 per cent by weight of an unsaturated monocarboxylic acid or of an anhydride of an unsaturated dicarboxylic acid,
 if desired
 d. 0 to 20 per cent by weight of a vinyl monomer, particularly styrene, acrylonitrile or methyl methacrylate, resulting during homopolymerization in a hard-brittle polymerizate, and, if desired,
 e. 0 to 3 per cent by weight of vinylpyridine, the weight ratio of the elastomeric copolymerizate A to the hard-brittle copolymerizate B being 1 : 20 to 1 : 3.

The elastomeric copolymerizate A is obtained by polymerization of different unsaturated monomers. The chief components are acrylic acid alkyl esters whose alkyl residue has one to eight carbon atoms. Examples of such alkyl residues are the methyl, ethyl, propyl, isopropyl, and ethylhexyl residues.

Acrylic acid may be employed as the unsaturated monocarboxylic acid. Maleic anhydride and itaconic acid anhydride may be used as the anhydride of an unsaturated dicarboxylic acid. The use of a mixture of these components is of advantage.

It is possible to add to the batch, for the polymerization of the elastomeric product A, monomers in amounts of up to 20 per cent by weight which will actually produce a hard-brittle polymerizate. Thus, the hardness and impact resistance are improved by an addition of acrylonitrile and styrene; an addition of methyl-methacrylate in the elastomeric component can improve the compatibility of the elastomeric copolymerizate with the hard-brittle copolymerizate. This results in an improvement of the transparency of the foil.

It is possible to add to the batch, for the production of the elastomeric copolymerizate, also up to 2 per cent by weight of a cross-linking monomer with at least two reactive non-conjugated double bonds in the molecule. Examples of such compounds are the diacrylic acid esters of dialcohols, such as for example ethylene glycol or butane dioldimethacrylate, and furthermore divinyl benzene, diallyl phthalate and methacrylic acid vinyl ester.

The hard-brittle copolymerizate B is composed, in the primary amount thereof, of styrene or a methacrylic acid alkyl ester whose alkyl residue has one to four carbon atoms. The alkyl residue of the ester group therefore may be a methyl, ethyl, n- and i-propyl or n- and i-butyl residue.

The hard-brittle copolymerizate furthermore contains 1 to 20 per cent by weight of a glycidyl ester of acrylic or methacrylic acid in addition to 1 to 20 per cent by weight of an unsaturated monocarboxylic acid or an anhydride of an unsaturated dicarboxylic acid. Examples therefor have already been indicated in connection with the production of the elastomeric copolymerizate.

The hard-brittle copolymerizate further may contain 0 to 20 per cent by weight of a vinyl monomer which would produce, during homopolymerization, a hard-brittle polymerizate. Here again, these are the same monomers which have been designated as optional additions during the preparation of the elastomeric copolymerizate, namely, for example, styrene, acrylonitrile and methyl-methacrylate.

It is possible to also add to the polymerization batch up to 3 per cent by weight of vinylpyridine for the preparation of the hard-brittle copolymerizate. Vinylpyridine catalyzes, because of its basic properties, the subsequent hardening of the foil during extrusion. In a catalyzing fashion acts likewise the addition of a quaternary ammonium chloride, such as, for example, triethylbenzyl ammonium chloride.

The weight ratio of the elastomeric copolymerizate A to the hard-brittle copolymerizate B is 1 : 20 to 1 : 3. One skilled in the art will set the respective ratio in accordance with the range of variations of the polymerization batches and the desired properties of the foil.

In contrast to the polymerizates of U. S. Pat. No. 3,297,621, the products of the process of the present invention are stable with respect to storage; that is to say, they do not fully harden at room temperature, but only at temperatures of about 120° to 160° C. It is further of special significance that in the polymerizate foils proposed by the present invention the elastomeric component is not adapted to be cross-linked at the predetermined conditions, and that accordingly the impact resistance — due to the preservation of the character of this component 14 is maintained after extrusion with heat and pressure. In the fully hardened state, the foils form hard, well-adhering, impact-resistant, transparent coatings which are stable to dilute acids and liquors as well as against alcohol and gasoline. These coatings will not swell, or only slightly so, even after a prolonged action thereon of chlorinated solvents, ethyl acetate or acetone.

The copolymerizate mixture for the preparation of the heat-hardenable foil proposed by the present invention may be obtained in different ways. Preferred in this connection are processes in which the elastomeric copolymerizate A and the hard-brittle copolymerizate B are polymerized in separate batches in the form of an emulsion or in solution. The polymerization itself is carried out in known manner.

During emulsion polymerization, for example, the monomer mixture for the preparation of the copolymerizate A or B is added to an aqueous solution of the emulsifier. The emulsion is mixed with the initiator and buffer and agitated to the complete exchange thereof. The latex obtained is precipitated, for example by the addition of methanol, rinsed and dried.

Suitable as emulsifiers are, among others, sodium lauryl sulfate, sodium diphenyl diphenyl sulfonate, polyethylene glycol isoctyl phenyl ether, sodium alkylaryl polyether sulfonate, tetrasodium-N-(1,2-dicarboxyethyl)-N-octadecylsulfosuccinate, polyethylene glycol nonyl phenyl ether, and polyethylene glycol tridecyl alcohol ether.

Sodium acetate, sodium hydrogen phosphate or sodium oxalate may be employed as buffer substances.

Suitable redox systems are preferably peroxides and hydroperoxides in combination with iron-(II)-salts, ascorbic acid, formamidine sulfinic acid or sodium formaldehyde sulfoxylate. The bivalent iron also may be used in the form of the ethylene diamine tetraacetic acid complex. A particularly suitable peroxide is cumene hydroperoxide.

The ratio of water to monomers in the emulsion is generally 1 : 1 to 1 : 5.

The polymerization of the monomers yielding or producing the hard-brittle component B is suitably carried out at a low temperature, for example at −5° to +20° C., in order to avoid any premature reaction of the epoxide groups with the carboxylic acid groups.

The thus obtained copolymerizates A and B are absorbed in suitable solvents, such as methylene chloride, tetrahydrofuran, chloroform or acetone; the solutions are mixed in the mixing ratio according to the present invention, and foils are cast therefrom.

Instead of emulsion polymerization, the polymerization also may be carried out in solution. The polymerization in solution renders possible the use of higher temperatures, as compared to emulsion polymerization, so that it is possible to operate at temperatures of 20° to 80° C. One proceeds, in principle, in known, manner. Suitable as solvents are, among others, dioxane, methylene chloride, tetrahydrofuran, methylethylketone and mixtures thereof. It is decisive for the choice of the solvent that it be capable of dissolving both the monomers and the polymerizate. The weight ratio of solvent to polymerizable monomers should generally be about 3 to 4 : 1. For example, diisoazobutyric acid nitrile, benzoyl peroxide, cumenehydroperoxide, or dicumene peroxide in amounts of about 0.5 per cent by weight, based on the monomers, may be employed as polymerization initiators. The thus obtained solutions of the copolymerizates A and B may be mixed thereafter in the desired quantitative relation. The preparation of the foils therefrom takes place again in known manner, for example by casting and evaporating the solvent.

It is also possible to carry out the polymerization of the monomer mixtures in two stages in only one emulsion or in only one solution. In such case, the monomers forming the elastomeric component A are polymerized first. The monomers which form the copolymerizate B are then polymerized in the emulsion or the solution of the copolymerizate A.

A joint polymerization of all of the monomers constituting the polymerizates A and B to one copolymerizate, instead of the mixture of two copolymerizates constituting the foil in accordance with the present invention, does not lead to products having the desired properties.

As has already been set forth hereinabove, the foil may be obtained in known manner from the solutions by casting and evaporating the solvent. The foil may be formed directly on the material to be treated or improved.

The preparation of the copolymerizate mixtures forming the foils will now be described in the following examples. The properties of the hardened foils also will be indicated therein. In the examples, parts are parts by weight.

EXAMPLE 1

Preparation Of An Elastomeric Methylacrylate-Containing Copolymerizate A 1

250 parts of water are freed from dissolved oxygen by boiling under nitrogen and are cooled to 25° C. Added thereto while stirring are 15 parts of sodium lauryl sulfate, 2 parts of $Na_2HPO_4$, 1.2 part of ethylene diamine tetraacetic acid, and thereafter a monomer mixture consisting of 50 parts of methylacrylate, 2.8 parts of acrylic acid, and 0.2 part of butane dioldimethacrylate. The mixture is homogenized; 1.2 part of $(NH_4)_2Fe(SO_4)_2.6H_2O$ (dissolved in 10 parts of water) and 0.28 part of cumenehydroperoxide (dissolved in 5 parts of butylacrylate) are added thereafter. The reaction proceeding at 25° C. under nitrogen is terminated after 4 hours by introducing the resultant latex into 1000 parts of saturated NaCl solution whereby the solid matter is precipitated. After filtration, any still adhering emulsifier is removed insofar as possible by washing with water, and the polymerizate is thereupon dried. The exchange amounts to 90 per cent, and the Staudinger index, measured at 20° C. in chloroform is 1.30 [100 ml/g].

EXAMPLE 2

Preparation of an Elastomeric Ethylacrylate-Containing Copolymerizate A 2

The procedure described in Example 1 above is repeated, with the exception that ethylacrylate is used instead of methylacrylate. The exchange after 5 hours amount to 94 per cent; the Staudinger index, measured at 20° C. in chloroform, is 1.35 [100ml/g].

EXAMPLE 3

Preparation of an Elastomeric N-Butylacrylate-Containing Copolymerizate A 3

The procedure described in Example 1 above is repeated, with the exception that butylacrylate is used instead of methylacrylate. The exchange after 5 hours amounts to 91 per cent; the Staudinger index, measured at 20° C. in chloroform, is 1.07 [100 ml/g].

EXAMPLE 4

Preparation of a Hard-Brittle Methylmethacrylate-Containing Copolymerizate B 1

600 parts of water are freed from dissolved oxygen by boiling under nitrogen acid anhydride 2.45 to 0 ° C. Added thereafter, while stirring, are 20 parts of sodium these sulfate, 12 parts of $Na_2HOP_4$, and 1.2 part of ethylene diamine tetraacetic acid. Then added is a monomer mixture consisting of 200 parts of methylmethacrylate, 20 parts of glycidyl methacrylate, 15.2 parts of acrylic acid and 1 part of vinylpyridine. The mixture is homogenized. Added thereto subsequently are 4.8 parts of $(NH_4)_2Fe(SO_4)_2.6H_2O$ (dissolved in 20 parts of water) and 1.12 part of cumenehydroperoxide (dissolved in 10 parts of methylmethacrylate). The reaction which proceeds at 0° C. under nitrogen is terminated after 4 hours by introducing the resultant latex into 2500 parts of methanol and the solid matter is thus precipitated. After filtration, any still adhering emulsifier is removed insofar as possible by washing with water and the polymerizate is then dried. The exchange amounts to 96.5 per cent, and the Staudinger index, measured at 20° C. in chloroform, is 2.45 [100 ml/g].

EXAMPLE 5

Preparation of a Hard-Brittle N-Butylmethacrylate-Containing Copolymerizate B 2

The procedure described in Example 4 above is repeated, with the exception that butylmethacrylate is employed instead of methylmethacrylate, and octylphenoxypolyethoxy ethanol instead of sodium lauryl sulfate. The exchange after 5 hours amounts to 92 per cent, and the Staudinger index, measured at 20° C. in chloroform, is 2.50 [100 ml/g].

EXAMPLE 6

Preparation of a Hard-Brittle Methylmethacrylate-, Styrene- and Acrylonitile-Containing Copolymerizate B 3

The procedure described in Example 4 above is repeated, with the exception that a mixture of methylmethacrylate, styrene and acrylonitrile in a weight ratio of 28 : 12 : 1 is employed instead of methylmethacrylate. The exchange after 5 hours amounts to 92 per cent, and the Staudinger index, measured at 20° C. in chloroform, is 2.40 [100 ml/g].

EXAMPLE 7

Preparation of the Foils According to the Present Invention

The copolymerizates prepared in Examples 1 to 6 are dissolved in methylene chloride and intermixed in the weight ratios indicated in the following table, and the mixtures are cast to films. Also compiled in the table are the impact tensile strengths before and after hardening (145° C/15 min) (DIN 53448), hardness DIN 53157 and the swelling index.

| Copoly-merizate mixture | Weight ratio | impact tensile strength [kp·cm/cm²] | Hardness according to König [sec] | | Swelling Index [%] 150°- 110 min |
| --- | --- | --- | --- | --- | --- |
| A1/B1 | 5 : 95 | 29 | 16 | 52 64 | 182 |
| A1/B1 | 10 : 90 | 42 | 34 | 47 58 | 189 |
| A1/B1 | 20 : 80 | 77 | 54 | 41 50 | 174 |
| A2/B1 | 10 : 90 | 48 | 40 | 50 60 | 171 |
| 171 3/B1 | 5 : 95 | 50 | 42 | 71 80 | 168 |
| A3/B1 | 10 : 90 | 66 | -47 | 69 79 | 172 |
| A3/B2 | 10 : 90 | >100 | >100 | 18 20 | 220 |
| A3/B2 | 20 : 80 | 100 | 100 | 11 14 | 235 |
| A3/B3 | 5 : 95 | 59 | 50 | 72 95 | 280 |
| A3/B3 | 10 : 90 | 69 | 58 | 70 89 | 287 |

EXAMPLE 8

Polymerization of a Methylacrylate-Containing Copolymerizate A in Emulsion Form and Subsequent Polymerization of a Methylmethacrylate-Containing Copolymerizate B in the Emulsion of the Copolymerizate A (Two-Stage Process)

250 parts of water are freed from dissolved oxygen by boiling under nitrogen and cooled to 45° C. Added thereto are 16 parts of octylphenoxypolyethoxyethanol and a monomer mixture consisting of 5.6 parts of methylacrylate, 0.7 part of acrylic acid and 0.007 part of butane-dioldimethylacrylate. The mixture is homogenized, and added dropwise thereto are 0.24 part of $K_2S_2O_8$ (dissolved in 5 parts of water). During the reaction, the temperature is maintained constant at 45° C., and stirring is effected under nitrogen. After 18 hours, cooling to 0° C. is effected and a sample of 5 ml is removed for the purpose of determining the exchange. A yield of 97 per cent is found. Thereafter 6 parts of $Na_2HPO_4$ and 1.2 part of the trisodium salt of ethylenediaminetetraacetic acid are stirred therein. Added thereto is a monomer mixture consisting of 86 parts of methylmethacrylate, 11.1 parts of glycidyl methacrylate, 2.8 parts of acrylic acid, 2.5 parts of maleic anhydride and 1 part of vinylpyridine, and again homogenized. Added thereafter are 1.2 part of $(NH_4)_2Fe(SO_4)_2 \cdot 6H_2O$ (dissolved in 10 parts of water) and 0.25 part of cumenehydroperoxide (dissolved in 5 parts of methylmethacrylate). While stirring is effected, the temperature during the reaction, which proceeds under nitrogen, is maintained constant at 0° C. After a reaction time of 5 hours the emulsion is introduced into 1000 parts of methanol and the polymerizate is thus precipitated. The polymerizate is washed with water several times for the purpose of removing the emulsifier; absorbed in 1000 parts of methanol and then squeezed off with a filter press. The yield amounts to 93 per cent, the Staudinger index, measured at 20° C. in toluene, is 2.53 [100 ml/g]. The polymerizate is soluble in benzene, toluene, methylene chloride, methylethylketone and tetrahydrofuran. The impact resistance in the hardened state (at 145° for 15 minutes) is 57 [kp·cm/cm²] and in the non-hardened state 70 [kp·cm/cm²] and the hardness according to Koenig is 82 [sec] prior to hardening and 105 [sec] after hardening.

A film cast from a 10 per cent solution of this material in methylene chloride is extruded at 145° C. for 15 minutes at 25 kg/cm² pressure on a chip plate. The film is transparent and does not display any tension crack corrosion after the action of methanol or ethanol-water mixtures thereon. The hardened film is stable against diluted acids and liquors, alcohol and gasoline. Acetone and ethylacetate hardly affect it after a short-time action (10 minutes); methylene chloride and trichloroethylene only moderately so. The gel content in the hardened polymer amounts to 100 per cent. The swelling index (H. Dannenberg and W. R. Harp, Jr., Anal. Chem. 28 (1956), 86), determined after a 24-hour residence time in a 1,2-dichloroethane atmosphere, amounts, after heating to 150° C. for minutes, to 215 per cent. A film stored at room temperature for 3 months is only slightly cross-linked and still displays good flowing capability during extrusion.

EXAMPLES 9 – '

Dependence of the Properties of the Copolymerizate Mixture Upon the Constituents of Copolymerizates A and B In accordance with Example 8, a series of experiments was carried out in which the ratio of elastomeric and hard-brittle copolymerizates is varied. The elastomeric copolymerizate A consisted of 90 mole per cent of methylacrylate and 10 mole per cent of acrylic acid; the hard-brittle copolymerizate B consisted of 80 mole per cent of methylmethacrylate, 10 mole per cent of acrylic acid and 10 mole per cent of glycidyl methacrylate. The following table shows the respective content of the copolymerizates A and B in the mixture, and furthermore the exchange after 18 hours reaction time at 45° C. and 5 hours at 0° C.; the Staudinger index, measured at 20° C. in chloroform; the swelling index; the impact tensile strength; and the hardness of the polymerizate mixtures before and after hardening (145° C./15 min.). The gel content amounts in all hardened polymerizates to 100 per cent.

TABLE FOR EXAMPLES 9 – 13

| copolymerizate A B [% by weight]- | Exec-hange [%] | [100η ml/g] | Swelling Index [%] | Impact Tensile Strength | | Hardness | |
| --- | --- | --- | --- | --- | --- | --- | --- |
| 5 95 | 97 | 2.55 | 220 | 44 | 38 | 82 | 100 |
| 10 90 | 90 | 2.35 | 232 | 62 | 53 | 80 | 95 |
| 15 85 | 93 | 2.30 | 220 | 76 | 59 | 76 | 87 |
| 20 80 | 91 | 2.25 | 205 | 89 | 72 | 62 | 72 |
| 30 70 | 85 | — | 236 | 161 | 95 | 47 | 54 |

EXAMPLE 14

Preparation of a Methylacrylate-(A) and Methylmethacrylate-Containing (B) Copolymerizate Mixture in a Two-Stage Process The procedure is as in Example 8, the batch is composed as follows:
Copolymerizate A
250 parts of water
10 parts of sodium lauryl sulfate
5.6 parts of methylacrylate
0.68 part of acrylonitrile
0.7 part of acrylic acid
0.07 part of butanedioldimethacrylate
0.24 part of $K_2S_2O_8$
Exchange : 98 per cent after 18 hours at 45° C.
Copolymerizate B 6.0 parts of $Na_2HPO_4$
1.2 part of trisodium ethylene diamine tetraacetic acid
72 parts of methylmethacrylate
13 parts of acrylonitrile
10 parts of glycidylacrylate
5.6 parts of acrylic acid
1.2 part of $(NH_4)_2Fe(SO_4)_2 \cdot 6H_2O$
0.28 part of cumenehydroperoxide
Exchange: 92 per cent after 6 hours at 0° C.

The copolymerizate mixture is soluble in benzene, methylene chloride, and tetrahydrofuran. The Staudinger index (chloroform/20° C.) is 2.32 [100 ml/g]. The impact tensile strength of the unhardened copolymerizate mixture is 80 [kp·cm/cm²]. The impact tensile strength of the hardened copolymerizate (145° C./15 min) is 65 [kp·cm/cm²]. The hardness of the unhardened copolymerizate mixture amounts to 79 [sec]. The hardness of the hardened copolymerizate (145° C./15 min) 100 100 [sec]. The swelling index is 245 per cent. A film extruded (140° C./15 min/25 kp/cm²) onto a hard fiber plate is transparent, adheres well and does not display any tension crack corrosion under the action of methanol or ethanol-water (1 : 1). Dilute acids or liquors, test benzene, ethanol-water (1 : 1) do not attack it even after prolonged action; acetone and ethyl acetate hardly affect it after a short-time action; methylene chloride and trichloroethylene affect it only moderately.

EXAMPLE 15

Preparation of an N-Butylacrylate-(A) and Butylmethacrylate-Containing (B) Copolymerizate Mixture in a Two-Stage Process The procedure is as in Example 8 above, with the exception that the required water is added in two parts before the first and the second stage. The batch is composed as follows:

Copolymerizate A
50 parts of water
2 parts of sodium lauryl sulfate
24.5 parts of acrylic acid-n-butyl ester
0.7 part of acrylic acid
0.25 part of $K_2S_2O_8$
Exchange: 96 per cent after 18 hours at 45° C.

Copolymerizate B
200 parts of water
6 parts of $Na_2HPO_4$
8 parts of sodium lauryl sulfate
2.4 parts of $(NH_4)_2Fe(SO_4)_2 \cdot 6H_2O$
2 parts of trisodium ethylene diamine tetraacetic acid
0.66 part of cumenehydroperoxide
0.29 part of formaldehyde sulfoxylate
80 parts of n-butylmethacrylate
10 parts of glycidyl acrylate
5 parts of acrylic acid
Exchange: 85 per cent.

The copolymerizate mixture is soluble in benzene, methylene chloride, methylethylketone, and tetrahydrofuran. The Staudinger index (chloroform/20° C.) amounts to 2.75 [100 ml/g]. The impact tensile strength of the unhardened copolymerizate mixture is 125 [kp·cm/cm²]. The impact tensile strength of the hardened copolymerizate (145° C./15 min) is 116 [kp·cm/cm²]. The hardness of the unhardened copolymerizate mixture amounts to 19 [sec]. The hardness of the hardened copolymerizate (145° C./15 min) is 23 [sec]. The swelling index(150° C./10 min.) is 235 per cent. A film extruded (140° C./15 min/25kp/cm²) onto a chip plate is transparent, adheres well and does not display any tension crack corrosion under the action of methanol or ethanol-water (1 : 1). Dilute acids and liquors, white spirit and 50 per cent alcohol solution do not affect it even under prolonged action; acetone and ethylacetate do not affect it at shorter action times; methylene chloride and trichloroethylene do swell it slightly, without, however, dissolving it.

EXAMPLE 16

Preparation of an N-Butylacrylate-(A) and Methylmethacrylate-Containing (B) Copolymerizate Mixture in a Two-Stage Process The procedure is as in Example 8; the batch is composed as follows:

Copolymerizate A
250 parts of water
8 parts of sodium lauryl sulfate
6 parts of $Na_2HPO_4$
2.4 parts of trisodium ethylene diamine tetraacetic acid
10.2 parts of n-butylacrylate
0.7 part of acrylic acid
0.25 part of $(NH_4)_2Fe(SO_4)_2 \cdot 6H_2O$
0.28 part of cumenehydroperoxide Copolymerizate B
50 parts of methylmethacrylate
10 parts of glycidylacrylate
5.6 parts of acrylic acid
0.25 part of $K_2S_2O_8$
Exchange: 95 per cent.

The copolymerizate mixture is soluble in benzene, methylene chloride, methylethylketone, and tetrahydrofuran. The Staudinger index (chloroform/20° C.) amounts to 3.05 [100 ml/g]. The impact tensile strength of the unhardened copolymerizate mixture is 61 [kp·cm/cm²]. The impact tensile strength of the hardened copolymerizate (145° C./15 min) is 53 [kp·cm/cm²]. The hardness of the unhardened copolymerizate mixture amounts to 75 [sec]. The hardness of the hardened copolymerizate (145° C./15 min) is 98 [sec]. The swelling index (150° C./10 min) is 240 per cent. A film extruded (140° C./15 min/25 kg/cm²) onto wooden material is transparent, adheres well, and does not display any tension crack corrosion under the action of methanol or ethanol-water (1 : 1). Dilute acids and liquors, white spirit, and 50 per cent ethanol solution do not affect it even after prolonged action; acetone and ethylacetate affect it little at shorter action times; methylene chloride and trichloroethylene swell it.

EXAMPLE 17

Preparation of an N-Butylacrylate and Methylmethacrylate-Containing Copolymerizate in one Stage (a Comparison of a Material Not Part of the Invention)

In contrast to Example 16, the monomers indicated therein are polymerized together in one stage in the same weight ratio. Exchange: 93 percent.

The Staudinger index (chloroform/20° C.) amounts to 1.85 [100 ml/g]. The impact tensile strength of the unhardened copolymerizate mixture is 48 [kp·cm/cm²]. The impact tensile strength of the hardened copolymerizate (145° C./15 min) is 35 [kp·cm/cm²]. The hardness of the unhardened copolymerizate mixture amounts to 70 [sec]. The hardness of the hardened copolymerizate (145° C./15 min) is 100 [sec]. The swelling index (150°C./10 min) is 216 per cent.

This example shows clearly that the non-inventive copolymerizate has a reduced impact tensile strength.

EXAMPLE 18

Preparation of an ethylacrylate-(A) and ethylmethacrylate- containing (B) copolymerizate mixture in a two-stage process The procedure is as in Example 8; the batch is composed as follows:

Copolymerizate A
300 parts of water
2 parts of sodium lauryl sulfate
5.6 parts of ethylacrylate
0.7 part of acrylic acid
0.9 part of acrylonitrile
0.07 part of butanedioldimethacrylate
Exchange : 98 per cent after 18 hours at 45°C.
Copolymerizate B
6 parts of $Na_2HPO_4$
1.2 part of trisodiumethylenediaminetetraacetic acid
78.7 parts of ethylmethacrylate
8.7 parts of acrylonitrile
10 parts of glycidylmethacrylate
2.6 parts of acrylic acid
1.2 part of $(NH_4)_2Fe(SO_4)_2·6H_2O$
0.28 part of cumenehydroperoxide
Exchange : 83.5 per cent after 7 hours at 0°C.

The Staudinger index (chloroform/20°C.) amounts to 2.60 [100 ml/g]. The impact tensile strength of the unhardened copolymerizate mixture is 78 [kp·cm/cm²]. The impact tensile strength of the hardened copolymerizate (145°C./15min) is 59 [kp·cm/cm²]. The hardness of the unhardened copolymerizate mixture amounts to 42 [sec]. The hardness of the hardened copolymerizate (145° C./15 min) is 54 [sec]. The swelling index is 345 per cent. A film extruded (140° C./15 min/25 kg/cm²) onto plywood is transparent, moderately adhering, and does not display any tension crack corrosion under the action of methanol or ethanol-water (1 :1). Diluted acids and liquors as well as white spirit do not affect it even after prolonged action; a 50 per cent and 96 per cent ethanol solution, and a 50 per cent $CH_3COOH$ solution affect it only very little; acetone and ethylacetate affect it to some extent; methylene chloride and trichloroethylene swell, but do not dissolve it.

EXAMPLE 19

Preparation of an n-butylacrylate-(A), styrene-, and maleic anhydride-containing (B) copolymerizate mixture in a two-stage process The procedure is as in Example 15; the batch is composed as follows:

Copolymerizate A
50 parts of water
10 parts of n-butylacrylate
0.7 part of acrylic acid
0.25 part of $K_2S_2O_8$
Exchange : 97 per cent after 18 hours at 45°C.
Copolymerizate B
250 parts of water
8 parts of sodium lauryl sulfate
2.4 parts of trisodium ethylene diamine tetraacetic acid
80 parts of styrene
10 parts of glycidylacrylate
7.6 parts of maleic anhydride
2.4 parts of $(NH_4)_2Fe(SO_4)_2·6H_2O$
(dissolved in 5 parts of water)
2.4 parts of cumenehydroperoxide
(dissolved in 5 parts of styrene)
Exchange : 87 per cent after 5 hours at 0°C.

The copolymerizate mixture is soluble in methylene chloride, and tetrahydrofuran. The Staudinger index (toluene/20° C.) amounts to 2.15 [100 ml/g]. The impact tensile strength of the unhardened copolymerizate mixture is 89 [kp·cm/cm²]. The impact tensile strength of the hardened copolymerizate (145° C./15 min) is 40 [kp·cm/cm²]. The hardness of the unhardened copolymerizate mixture amounts to 130 [sec]. The swelling index (150° C./10 min) is 280 per cent. A film extruded (140° C./15 min/25 kp/cm²) onto a chip plate is slightly turbid, adheres well and does not show any tension crack corrosion under the action of methanol or ethanol-water (1 : 1). Dilute acids and liquors, white spirit, and 50 per cent ethanol solution do not affect it; 96 per cent ethanol solution causes a slight white coloration together with a very limited swelling after prolonged action; methylene chloride and ethyl acetate swell it after prolonged action without dissolving it.

EXAMPLE 20

Preparation of an n-butylacrylate-(A), styrene-, and acrylic acid- containing (B) copolymerizate mixture in the two-stage process The procedure is as in Example 15; the batch is composed as indicated in Example 19, with the exception that, instead of 7.6 parts maleic anhydride, 5.6 parts of acrylic acid are employed for the copolymerizate B.

Copolymerizate A: exchange 98 per cent after 18 hours at 45° C.
Copolymerizate B: exchange 91 per cent after 5 hours at 0° C.

The copolymerizate mixture is soluble in methylene chloride, tetrahydrofuran, and benzene. The Staudinger index (toulene/20° C.) amounts to 2.28 [100 ml/g]. The impact tensile strength of the unhardened copolymerizate mixture is 89 [kp·cm/cm²]. The impact tensile strength of the hardened copolymerizate (145° C./15 min) is 32 [kp·cm / cm²]. The hardness of the unhardened copolymerizate mixture amounts to 121 [sec]. The hardness of the hardened copolymerizate (145° C./15 min) is 157 [sec]. The swelling index (150° C./10 min) is 321 per cent. A film extruded (145° C./15 min/25 kp/cm²) onto a chip plate is very slightly turbid, moderately adhering, and does not show any tension crack corrosion under the action of methanol or ethanol-water (1 :1). Dilute acids and liquors, ethanolwater (1 :1) and white spirit do not attack it; a 96 per cent ethanol solution and acetone slightly swell it after prolonged action and cause a white coloration; ethyl acetate and ethylene chloride swell it after prolonged action, but do not dissolve it.

EXAMPLE 21

Preparation of a methylacrylate-(A) and methylmethacrylatestyrene-containing (B) copolymerizate mixture in a two-stage process The procedure is as indicated in Example 15; the batch is composed as follows: Copolymerizate A 50 parts of water
2 parts of octylphenoxypolyethoxyethanol
24.5 parts of methylacrylate
0.7 part of acrylic acid
0.25 part of $K_2S_2O_8$
Exchange: 96 per cent after 18 hours at 45°C.
Copolymerizate B
200 parts of water
8 parts of octylphenoxypolyethoxyethanol
6 parts of $Na_2HPO_4$
2 parts of trisodiumethylenediamine tetraacetic acid
80 parts of methylmethacrylate
5 parts of styrene
10 parts of glycidylacrylate
5 parts of maleic anhydride
0.66 part of formaldehyde sulfoxylate
0.29 part of cumenehydroperoxide
Exchange: 95 per cent after 5 hours at 0°C.

The copolymerizate mixture is soluble in methylene chloride, tetrahydrofuran, and benzene. The Staudinger index (chloroform/20° C.) amounts to 2.35 [100 ml/g]. The impact tensile strength of the unhardened copolymerizate mixture is 75 [kp·cm/cm²]. The impact tensile strength of the hardened copolymerizate (145° C./15 min) is 61 [kp·cm/cm²]. The hardness of the unsaturated copolymerizate mixture amounts to 85 [sec]. The hardness of the hardened copolymerizate (145° C./15 min) is 98 [sec]. The swelling index (150° C./10 min) is 248 per cent. A film extruded (140° C./15 min/25 kp/cm²) onto a chip plate is transparent, adheres well, and does not show any tension crack corrosion under the action of methanol or ethanol-water (1 : 1) Dilute acids and liquors, ethanol-water (1 : 1) do not attack it; white spirit and a 96 per cent ethanol solution slightly attack it after a prolonged action; ethylene chloride and ethyl acetate slightly swell it after prolonged action.

EXAMPLE 22

Preparation of an n-butylacrylate-(A) and n-butylmethacrylate- and styrene-containing (B) copolymerizate mixture in a two-stage process The procedure is as indicated in Example 15; the batch is composed as follows:
Copolymerizate A
50 parts of water
2 parts of sodium lauryl sulfate
24.5 parts of n-butylacrylate
0.7 part of acrylic acid
0.125 part of $K_2S_2O_8$
Exchange: 97 per cent after 18 hours at 45°C.
Copolymerizate B
200 parts of water
6 parts of $Na_2HPO_4$
8 parts of sodium lauryl sulfate
2 parts of trisodiumethylene diamine tetraacetic acid
80 parts of butylmethacrylate
5 parts of styrene
10 parts of glycidylacrylate
5 parts of maleic anhydride
2.4 parts of $(NH_4)_2Fe(SO_4)_2·6H_2O$
0.66 part of cumene hydroperoxide
Exchange: 90 per cent after 4 hours at 0°C.

The copolymerizate mixture is soluble in methylene chloride, tetrahydrofuran, and benzene. The Staudinger index (chloroform/20° C.) amounts to 2.29 [100 ml/g]. The impact tensile strength of the unhardened copolymerizate mixture is 133 [kp·cm/cm²]. The impact tensile strength of the hardened copolymerizate (145° C./15 min) is 110 [kp·cm/cm²]. The hardness of the unhardened copolymerizate mixture amounts to 30 [sec.]. The hardness of the hardened copolymerizate (145° C./15 min) is 36 [sec]. The swelling index (150° C./10 min) is 215 per cent. A film extruded (145° C./15 min/25 kp/cm²) onto wood material is slightly turbid, moderately adhering, and does not show any tension crack corrosion under the action of methanol or ethanol-water (1 : 1). Dilute acids and liquors and ethanol-water (1 : 1) do not attack it; white spirit attacks it little; methylene chloride, ethyl acetate and acetone swell it after prolonged action, but do not dissolve it.

EXAMPLE 23

Preparation of an n-butylacrylate-(A) and methylmethacrylate-, styrene-, and acrylonitrile-containing (B) copolymerizate mixture in a two-stage process in solution
Copolymerizate A 300 parts of xylene and 300 parts of methylethylketone are freed from dissolved oxygen by boiling at reflux under nitrogen. Then added to the solvent mixture are 12.8 parts of n-butylacrylate, 0.78 part of acrylic acid, and 0.09 part of ethylene glycol dimethacrylate; nitrogen is once again passed through for 2 hours, and polymerization is then initiated with 0.15 part of dicumene peroxide. Stirring is now effected at 70° C. for 24 hours at which time an exchange of 78 per cent is achieved.
Copolymerizate B In a second stage, 67 parts of methylmethacrylate, 28 parts of styrene, 2.4 parts of acrylonitrile, 15.2 parts of glycidyl methacrylate, 7.2 parts of acrylic acid, and 1.5 part of dicumene peroxide are added to the solution of the copolymerizate A. The batch is stirred at 70° C. under nitrogen; after 24 hours reaction time, another 0.75 part of dicumene peroxide is added. Obtained after a total of 72 hours, and after precipitation with five times the amount of methanol, is an exchange of 88 per cent. The Staudinger index, determined in chloroform at 20° C., amounts to 1.85 [100 ml/g]. The polymerizate is soluble in benzene, methylene chloride, and tetrahydrofuran.

From the solution, a film is cast whose impact tensile strength and hardness in the unhardened state amount to 55 / kp·cm/cm² / and, respectively, 78 [sec], and in the hardened state 34 / kp·cm/cm² / and, respectively, 111 [sec]. The swelling index is found to be 232 per cent. The film pressed onto a chip plate at a pressure of 25 kp/cm² for 15 minutes is transparent and adheres well; tension crack corrosion under the action of methanol or ethanol-water mixtures does not arise. The hardened film is stable against dilute acids and liquors, and against ethanol and gasoline. Acetone and ethyl acetate attack it only to a minor extent after a short-time action; methylene chloride and trichloroethylene swell it somewhat but do not dissolve it.

EXAMPLE 24

The procedure is as in Example 23; the batch is composed of:
Copolymerizate A
300 parts of xylene
300 parts of methylethylketone
12.8 parts of n-butylacrylate 0.7 part of acrylic acid
0.09 part of ethylene glycol dimethacrylate
0.15 part of dicumene peroxide
Exchange : 72 per cent after 18 hours at 70° C.
Copolymerizate B
69.3 parts of methylmethacrylate
5.9 parts of acrylic acid
11.2 parts of glycidyl methacrylate
1.5 part of dicumene peroxide
Exchange : 55 per cent after 12 hours at 70° C. The impact tensile strength of the hardened copolymerizate (145° C./15 min) is 38 [kp·cm/cm$^2$]. The hardness of the unhardened copolymerizate mixture amounts to 79 [sec]. The hardness of the hardened copolymerizate is 95 [sec]. The swelling index is 234 per cent. A film extruded (140° C./15 min/25 kp/cm$^2$) onto a chip plate is transparent, adheres well, and does not display any tension crack corrosion under the action of methanol or ethanol water (1 : 1). Dilute liquors or acids, white spirit ethanol-water (1 : 1) do not attack it even after prolonged action; acetone and ethylacetate attack it only very little after a short-time action; methylene chloride and trichloroethylene will slightly swell it but will not dissolve it.

It will be obvious to those skilled in the art that many modifications may be made within the scope of the present invention without departing from the spirit thereof, and the invention includes all such modifications.

What is claimed is:

1. A heat-hardenable foil comprising a mixture of copolymerizates (A) and (B) in a weight ratio of 1:20 to 1:3,
    A. being an elastomeric copolymerizate obtained by polymerization of
        a. 70 to 99 per cent by weight of an acrylic acid alkyl ester, whose alkyl residue has one to eight carbon atoms, and
        b. 1 to 30 per cent by weight of a compound selected from the group consisting of an unsaturated monocarboxylic acid or an anhydride of an unsaturated dicarboxylic acid, and
    B. being a hard-brittle copolymerizate obtained by polymerization of
        a. 60 to 70 per cent by weight of a compound selected from the group consisting of styrene or a methacrylic acid alkyl ester whose alkyl residue has one to four carbon atoms,
        b. 1 to 20 per cent by weight of a glycidyl ester of acrylic or methacrylic acid, and
        c. 1 to 20 per cent by weight of a compound selected from the group consisting of an unsaturated monocarboxylic acid or an unsaturated dicarboxylic acid.

2. A heat-hardenable foil according to claim 1 in which component (A) contains up to 20 per cent by weight of a vinyl monomer.

3. A heat-hardenable foil according to claim 2 in which the vinyl monomer is selected from the group consisting of styrene, acrylonitrile or methylmethacrylate.

4. A heat-hardenable foil according to claim 1 in which component (A) contains up to 2 per cent by weight of a cross-linking monomer having at least 2 reactive non-conjugated double bonds in the molecule.

5. A heat-hardenable foil according to claim 1 in which component (B) contains up to 20 per cent by weight of a vinyl monomer.

6. A heat-hardenable foil according to claim 5 in which the vinyl monomer is selected from the group consisting of styrene, acrylonitrile or methylmethacrylate.

7. A heat-hardenable foil according to claim 1 in which component (B) contains up to 3 per cent by weight of vinylpyridine.

8. A process for preparing a heat-hardenable foil which comprises polymerizing the monomers forming copolymerizates (A) and (B), as defined in claim 1, in separate batches in the form of an emulsion, separating the copolymerizates from the aqueous phase, dissolving them in a solvent, intermixing them in a desired mixing ratio, and forming the foil by evaporation of the solvent.

9. A process for preparing a heat-hardenable foil which comprises polymerizing the monomers forming copolymerizates (A) and (B), as defined in claim 1, in separate batches in the form of a solution, intermixing the solutions in a desired mixing ratio, and forming the foil by evaporation of the solvent.

10. A process for preparing a heat-hardenable foil which comprises first polymerizing the monomers forming copolymerizate (A), as defined in claim 1, in an emulsion, then adding the monomers forming copolymerzate (B), as defined in claim 1, to the emulsion of copolymerizate (A) and polymerizing the monomers of copolymerizate (B), separating the copolymerizate mixture from the aqueous phase, dissolving it in a solvent, and forming the foil by evaporation of the solvent.

11. A process for preparing a heat-hardenable foil which comprises first polymerizing the monomers forming copolymerizate (A), as defined in claim 1, in solution, then adding the monomers forming copolymerizate (B), as defined in claim 1, to the solution of copolymerizate (A) and polymerizing the monomers of copolymerizate (B), and forming the foil by evaporation of the solvent.

* * * * *